United States Patent [19]

Palma

[11] Patent Number: 5,196,752

[45] Date of Patent: Mar. 23, 1993

[54] SYSTEM FOR SUPPORTING CONDUCTORS FOR USE IN A DYNAMOELECTRIC MACHINE

[75] Inventor: Rodolfo Palma, Troy, N.Y.

[73] Assignee: REM Technologies, Inc., Schenectady, N.Y.

[21] Appl. No.: 785,761

[22] Filed: Oct. 31, 1991

[51] Int. Cl.$^5$ ............................................. H02K 3/46
[52] U.S. Cl. ..................................... 310/260; 310/45; 310/71; 310/91; 310/184; 310/195; 310/198; 310/201; 310/214
[58] Field of Search ............... 310/71, 91, 201, 184, 310/45, 259, 194, 179, 180, 254, 198, 42, 208, 260, 270, 214, 261, 195

[56] References Cited

U.S. PATENT DOCUMENTS

| | | |
|---|---|---|
| 437,501 | 9/1890 | Mordey. |
| 2,519,697 | 8/1950 | Allen .................................. 171/252 |
| 3,321,652 | 12/1963 | Opel .................................... 310/168 |
| 3,588,559 | 6/1971 | Fono .................................... 310/168 |
| 3,912,958 | 10/1975 | Steen ................................... 310/168 |
| 3,944,863 | 3/1976 | Apsit et al. ........................ 310/168 |
| 4,100,444 | 7/1978 | Boyd, Jr. ............................ 310/184 |
| 4,134,054 | 1/1979 | Akamatsu .......................... 318/685 |
| 4,218,645 | 8/1980 | Kirsch et al. ...................... 322/47 |
| 4,227,106 | 10/1980 | Druss .................................. 310/184 |
| 4,260,917 | 4/1981 | Lundin ............................... 310/71 |
| 4,639,626 | 1/1987 | McGee ............................... 310/155 |
| 4,659,953 | 4/1987 | Luneau ............................... 310/111 |
| 4,670,696 | 6/1987 | Byrne et al. ....................... 318/701 |
| 4,720,646 | 1/1988 | Torimoto ............................ 310/71 |
| 4,731,555 | 3/1988 | Torimoto ............................ 310/71 |
| 4,786,834 | 11/1988 | Grant .................................. 310/194 |
| 4,825,112 | 4/1989 | Mineyama ......................... 310/71 |
| 4,864,176 | 9/1989 | Miller ................................. 310/194 |
| 4,926,079 | 5/1990 | Niemela ............................. 310/71 |
| 4,954,737 | 9/1990 | Guichard ........................... 310/168 |
| 5,053,663 | 10/1991 | Boer .................................... 310/91 |

OTHER PUBLICATIONS

G. Geauchemin, "Brushless dc Motors Yield Design Payoffs", *Design News*, Apr. 8, 1991, pp. 58–60.

Primary Examiner—R. Skudy
Attorney, Agent, or Firm—Heslin & Rothenberg

[57] ABSTRACT

A system for supporting conductors in a dynamoelectric machine having a stator assembly with a plurality of stationary armature elements spaced about a circumference positioned radially about a central longitudinal axis, where each armature element includes an armature winding on a base portion and a leg extending from each of the base portions in a radially inward direction, includes a spacer for supporting one or more electrical conductors and for insulating the one or more conductors for an armature element. The spacer is mountable on the armature element and may comprise one or more grooves for supporting one or more interconnecting bars which are capable of connecting the armature windings of two or more armature elements. The spacers may be fastened to the stator assembly and allow the stator assembly to be equipped with conductors which may be oriented in a pattern which minimizes conductor length and minimizes energy losses.

22 Claims, 9 Drawing Sheets

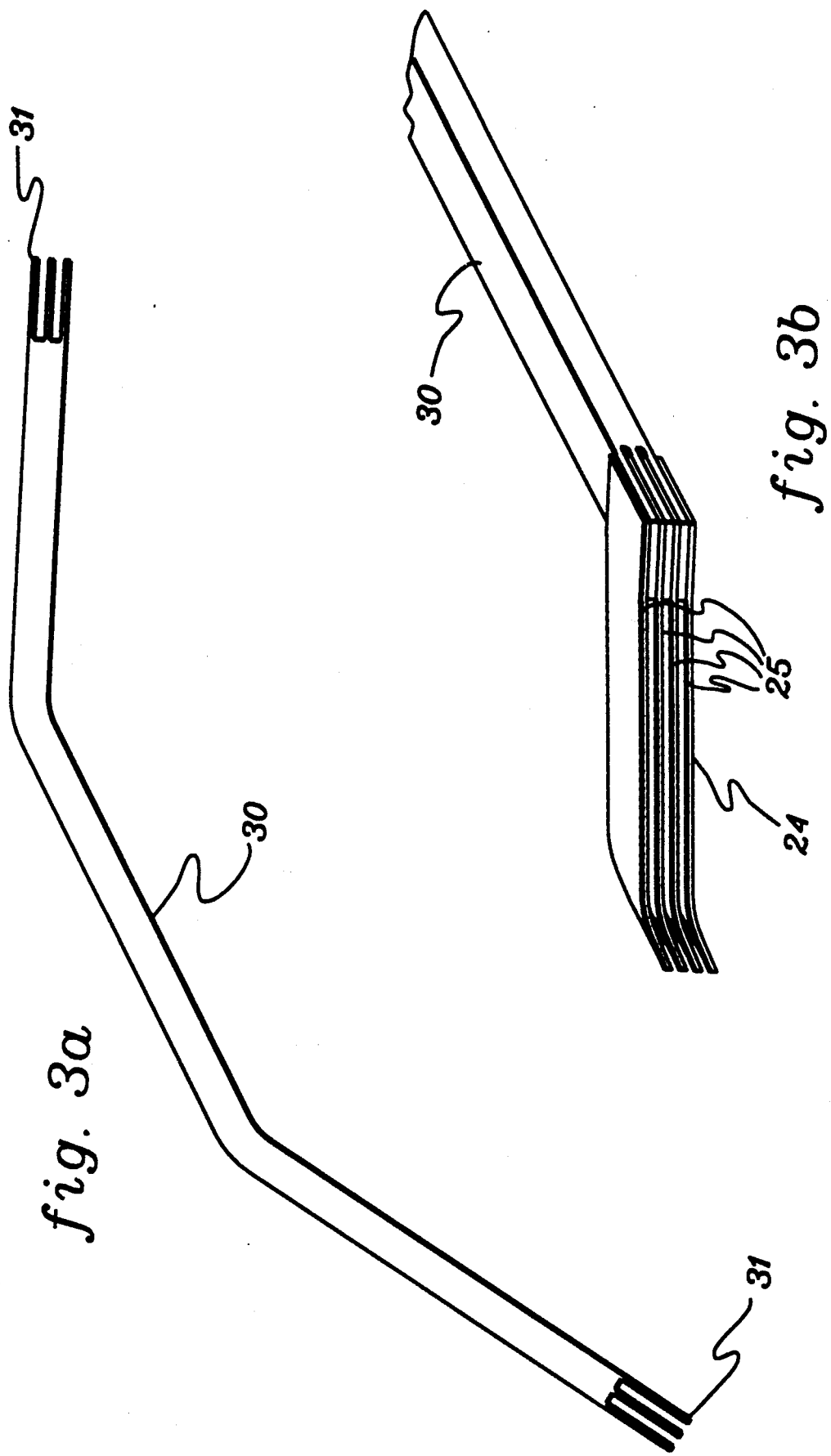

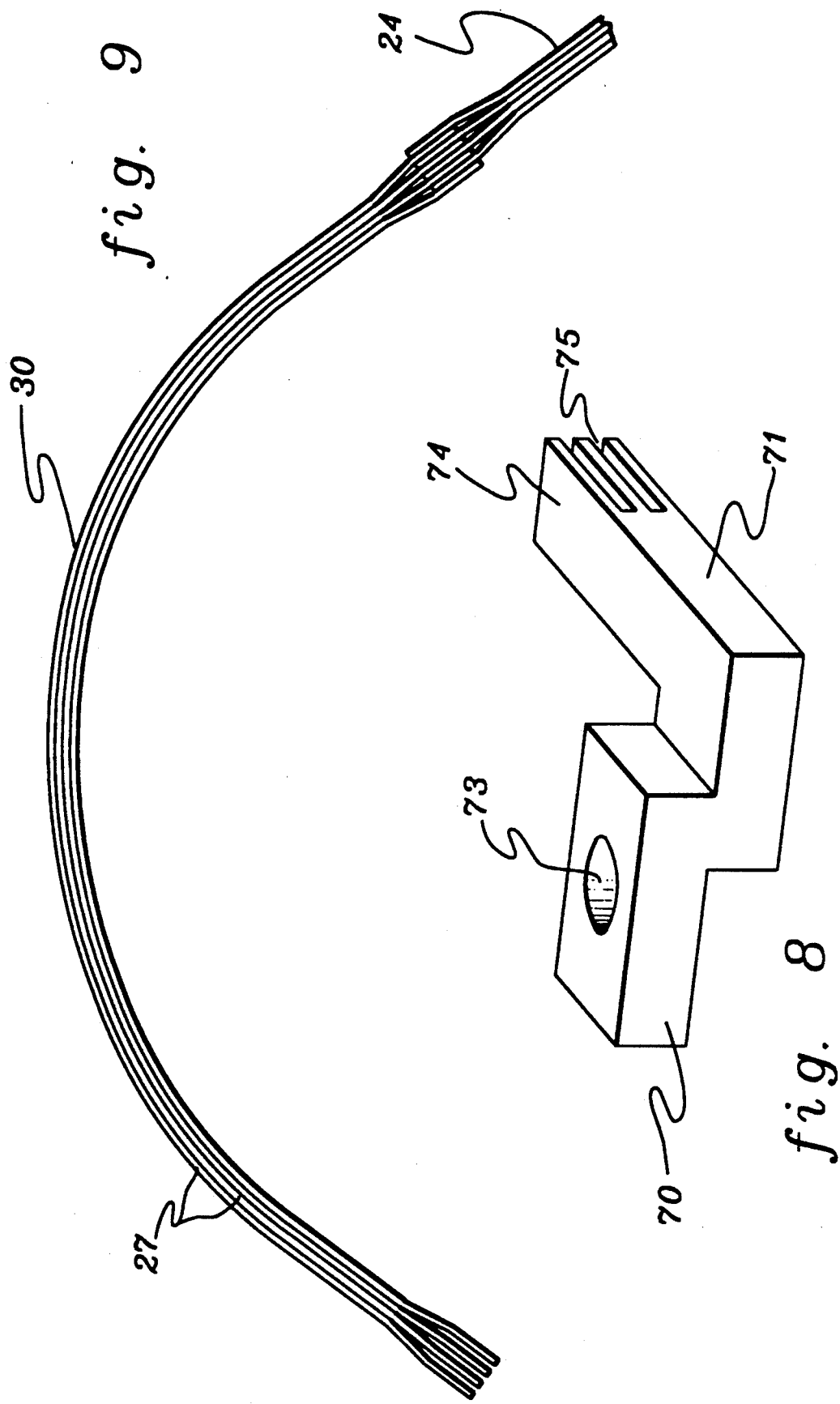

5,196,752

SYSTEM FOR SUPPORTING CONDUCTORS FOR USE IN A DYNAMOELECTRIC MACHINE

BACKGROUND OF THE INVENTION

1. Field of the Invention

This invention relates to inductor type dynamoelectric motors and, more specifically, to a support and positioning structure for conductors of a stator assembly of such a motor.

2. Background Art

Dynamoelectric machines are commonly used as motors for converting electrical to mechanical energy. Inductor type dynamoelectric motors may be used as adjustable speed drives for high speed operation. A dynamoelectric machine may also be used for electrical generation by driving its rotor in reverse thereby producing energy in the armature windings. Inductor type dynamoelectric machines are generally characterized by a stator which includes both AC armature and DC exitation coils surrounding a coil-less rotor. In this configuration, there are no rotating field or armature coils, slip rings, brushes and associated connections which are common to machines having rotating windings. Since inductor type dynamoelectric machines contain fewer rotating parts, have a more rugged rotor construction and are particularly suitable for high speed application. One version of such an inductor type dynamoelectric machine, employs a circumferentially distributed arrangement of C-shaped armature elements surrounding a generally cylindrical field coil which in turn encloses a transverse pole magnetic rotor. U.S. Pat. Nos. 437,501 and 2,519,697 and 3,912,958 describe earlier machines of this type of design.

More recent versions of such inductor type machines are disclosed in commonly owned U.S. Pat. Nos. 4,786,834 and 4,864,176. In these patents, a spool-like support structure supporting field windings and armature elements is disclosed. The spool-like structure is made of a nonmagnetic material and has a hollow, elongated central portion extending concentrically about a longitudinal axis. This central portion supports a field coil and defines an interior longitudinal passageway for accommodating the insertion of a coaxial rotor. End portions are located at each end of the central portion and extend radially outward therefrom. Each of the end portions is preferably provided with radially oriented grooves in its axially outermost surface. The grooves are configured to receive and orient legs of generally C-shaped armature coil elements arranged in a circumferentially distributed pattern about the periphery of the spool-like structure. The armature elements are thereby positioned in three orthogonal directions.

Other features, advantages and benefits of these dynamoelectric machines, including the stator support structures thereof, are described in detail in U.S. Pat. Nos. 4,786,834 and in 4,864,176. Each of these patents is incorporated herein by reference and made a part of this disclosure.

The C-shaped armature elements contain armature windings thereon which carry an AC current and generate a magnetic flux which drives the rotor when the machine is used as a motor. In this situation, the current must be supplied to each of the circumferentially oriented C-shaped armature element's windings. Typically, low power, dynamoelectric machines require less current through the armature windings thereby requiring lighter gauge windings. Accordingly, the conductors transmitting current to the windings may also be of a relatively light gauge. Because lighter gauge conductors are used in these low power, dynamoelectric machines, there have been few problems connecting the armature windings to the conductors, supporting the conductors, and connecting the conductors from the windings to a power supply wire outside of the dynamoelectric machine. For example, a light gauge power supply wire is typically fed through the housing of a low power dynamoelectric machine. The wire is then connected to a printed circuit board which contains a network of conductors therein which distributes the current therethrough and into the armature windings which are typically soldered to portions of the network. In this situation, the conductors are of relatively light gauge and are supported within the circuit board.

In high power high speed rotation dynamoelectric machines, the power to supplied to the armature windings is greater than in low power machines. These machines require high frequency currents. However, at high frequency, the effective AC resistance of conductors increases with increasing frequency. To reduce the increase of conductor resistance at high frequency, the armature conductors may be multiple isolated ribbon-like strands. Therefore, heavier gauge conductors are needed to supply the necessary current. However, these higher gauge conductors are often too heavy and bulky to be supported by a printed circuit board or similar type support structure. Also, the conductors are not easily connected to the armature windings.

It is therefore desirable to provide a system for supporting conductors which supply current to the armature windings of a high power, high speed dynamoelectric machine. It is also desireable to provide a system for connecting the conductors to the armature windings and to provide a system which does not significantly increase the size of a dynamoelectric machine.

SUMMARY OF THE INVENTION

The aforementioned objects are achieved, and additional benefits are realized, by providing a system for supporting conductors in a dynamoelectric machine in accordance with the principles of the present invention.

The system includes a spacer for supporting one or more electrical conductors and for insulating one or more conductors from an armature element. The spacer is mountable on the armature element and may include one or more grooves therein for supporting one or more interconnecting bars. The system also includes a means for fastening the spacer to the armature element. This means may include an aperture located within the spacer, the aperture being capable of receiving a fastener therethrough. The system may further comprise a fastener inserted through the aperture into the stator assembly. Also, the fastener may be inserted into a ring shaped member.

The spacer may include a recess sized to received an armature element therein for positioning the spacer means on the armature element. The recess is located such that the grooves are exposed to the inner wall of the dynamoelectric machine when the spacer is positioned on the armature element. The system may include a plurality of spacers, each spacer mounted on a corresponding armature element.

The system may also include a plurality of spacers, each spacer being mounted on an armature element and having a plurality of grooves therein, each spacer being configured to enable the grooves therein to be oriented toward an end wall of the dynamoelectric machine, a plurality of interconnecting bars acting as conductors for the armature windings, each interconnecting bar being inserted within a groove of one of more spacers thereby being supported by one or more spacers, and means for connecting the interconnecting bars to the armature winding of the armature elements.

The system may comprise a stator assembly including twelve circumferentially oriented C-shaped armature elements for a four pole dynamoelectric machine, each armature element numbered sequentially starting from a first element and continuing counterclockwise to a twelfth armature element, each armature element having armature windings being wound thereon in the same axial direction, the interconnecting bars being connected at each end thereof to an armature winding of two different armature elements.

The system may also include the grooves of each of the spacers forming a first, second, and third radial mounting position for the interconnecting bars.

The system may also include the windings of the first and fourth armature elements being connected to each other by a first of the interconnecting bars located towards a first end wall of the machine. The armature windings of the fourth and seventh armature elements may be connected to each other by a second of the interconnecting bars located towards a second end wall of the machine. The armature windings of the seventh and tenth armature elements may be connected to each other by a third of said interconnecting bars located towards the first end wall of the machine, and the end of the winding of the first armature element located towards the second end wall of the machine may be connected to an external current at a first phase.

The system may also include the armature windings of the eleventh and eighth armature elements being connected to each other by a fourth of the interconnecting bars located towards the first end wall of the machine. The armature windings of the eighth and fifth armature elements may be connected to each other by a fifth of the interconnecting bars located towards the second end wall of the machine. The armature windings of the fifth and second armature elements may be connected to each other by a sixth of said interconnecting bars located towards the first end wall of the machine. The end of the winding of the eleventh armature element, located towards the second end of the machine, may be connected to an external current at a second phase.

The system may also include the armature windings of the third and sixth armature elements being connected to each other by a seventh of said interconnecting bars located towards the first end wall of the machine. The armature winding of the sixth and ninth armature elements may be connected to each other by an eighth of the interconnecting bars located towards the second end wall of the machine. The armature winding of the ninth and twelfth armature elements may be connected to each other by a ninth of the interconnecting bars located towards the first end wall of the machine. The end of the armature end of the winding of the third armature element located towards the second end of the machine may be connected to an external current at a third phase, and the armature windings of the tenth, twelfth and second armature elements may be connected to each other by a tenth interconnecting bar located towards the second end wall of the machine thereby forming a neutral phase point. A similar connection pattern should be used for machines with number of poles different from four poles.

The means for connecting the interconnecting bars to the armature windings may include a plurality of slots located at the ends of each of the interconnecting bars. The slots may be capable of receiving armature windings therein such that the armature windings and the ends of the interconnecting bars may be spot welded together, brazed, or soldered, bolted or the like. The system may further comprise a receiver for connecting a supply line conductor bar to one of said armature windings thereby allowing a current to be transmitted to the armature winding via the receiver. The receiver may comprise a leg capable of being inserted into one of the grooves of the spacer wherein the receiver may be supported by the spacer. The receiver leg may contain a plurality of slots therein, the slots being capable of receiving armature windings therein, wherein at least one of the armature windings may be connected to the receiver.

BRIEF DESCRIPTION OF THE DRAWINGS

These and other features of the present invention will be more readily understood from the following detailed description, when considered in conjunction with the accompanying drawings in which:

FIG. 3A depicts a top view of an interconnecting bar used in the system depicted in FIG. 1.

FIG. 3B depicts the technique of connecting an interconnecting bar to armature windings for a four pole three-phase machine in accordance with the principles of the present invention.

FIG. 8 depicts an isometric view of a receiver useable in the system for supplying current; and FIG. 9 depicts an interconnecting bar having a plurality of ribbon-like strands useable in accordance with the principles of the present invention.

DETAILED DESCRIPTION

Figure 1:
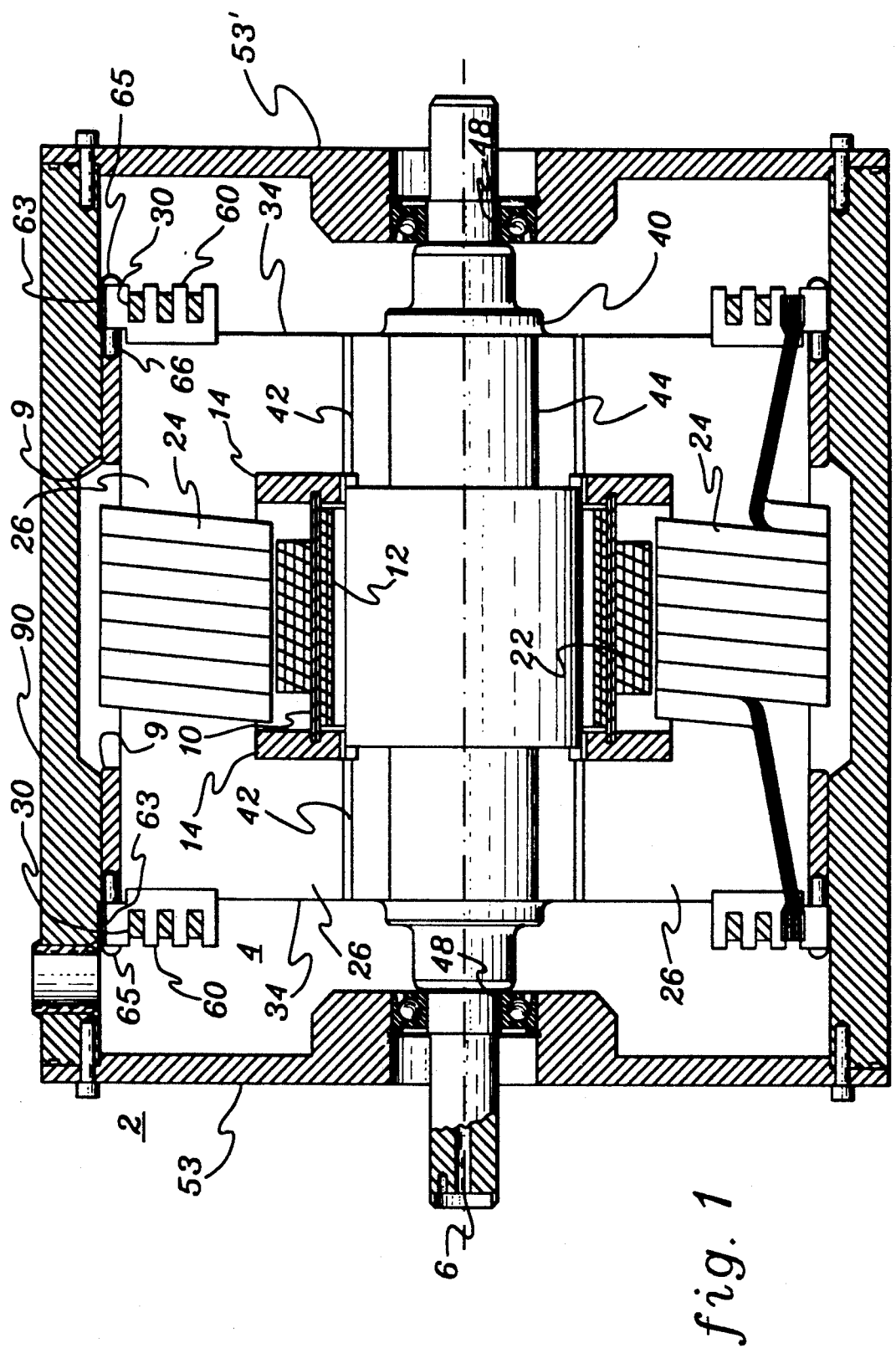
FIG. 1 is a cross sectional view from the side of an inductor type dynamoelectric machine including a stator assembly having a system for supporting conductors for use in a dynamoelectric machine in accordance with the principles of the present invention.

Referring to FIG. 1, an inductor type rotating dynamoelectric machine, generally denoted 2, includes a stationary stator assembly 4 surrounding a rotatable coil-less rotor 40, all within a housing 90. The transverse pole magnetic rotor 40 extends along and is coaxial with the longitudinal axis 6. The rotor is preferably made of a solid one piece construction and is supported by bearings 48 located within first and second end walls 53 and 53' of the housing 90. First end wall 53 is located at a first end of machine 2 (left side of FIG. 1) and second end wall 53' is located at a second end of the machine (right side of FIG. 1). Rotor 40 is provided with circumferentially spaced, axially extending surface recesses or cutouts 42 at the ends thereof, which define a desired number of lobes 44 at each end of the rotor, in a manner well known in the art. The rotor may be constructed of any available magnetic material such as carbon steel. The machine includes a stator assembly 4 which includes an internal spool-like structure 10. The spool-like structure 10 has a central, generally cylindrical portion 12 which is coaxial with longitudinal axis 6 and defines an interior, longitudinally extending central passageway for receiving rotor 40. Field (or DC exitation) windings 22 are coiled about and supported by the exterior surface of cylindrical portion 12.

The spool-like structure 10 of stator assembly 4 also includes a pair of end portions 14. The end portions are generally disc shaped structures having a central opening therein and also having a disc shaped member which serves to mount and precisely position a plurality of circumferentially distributed C-shaped (also referred to as U- or arc-shaped) armature elements 26. As shown in FIG. 1 and the blown-up view of FIG. 7, each armature core element 26 is preferably provided with an individual AC armature coil or winding 24 coiled about and supported by a longitudinally extending base portion of the core element. Armature elements 26 are made of a magnetic material while the end portions 14 are composed of a non-magnetic material such as aluminum or a phenolic.

Various stator assemblies and support structures may be used to support and position C-shaped armature elements about a rotor for use as a dynamoelectric machine. Both U.S. Pat. Nos. 4,786,834 and 4,864,176, each incorporated herein by reference and made a part of this disclosure, disclose dynamoelectric machines containing various stator assemblies and support structures. The system for supporting conductors in accordance with the principles of the present invention may be useable in any of these stator assemblies and the invention is not limited in its application or use to any particular stator assembly.

Referring again to FIG. 1, if a DC current is applied to the field windings 22, and the rotor is rotated, energy will be produced in the armature windings 24 and the machine will function as a generator. If the armature windings 24 are supplied with an AC current in a manner to produce a rotating magnetic flux wave between the legs 34 of the C-core armature elements and the poles of the rotor 40 at the rotor lobes 44, the rotor will rotate and the machine will function as a motor.

The stator assembly for the dynamoelectric machine includes a pair of nonmagnetic ring shaped members 9. The ring shaped members are described in detail in applicant's corresponding U.S. patent application Ser. No. 763,632, which is incorporated herein by reference and made a part of this specification.

Figure 2A:
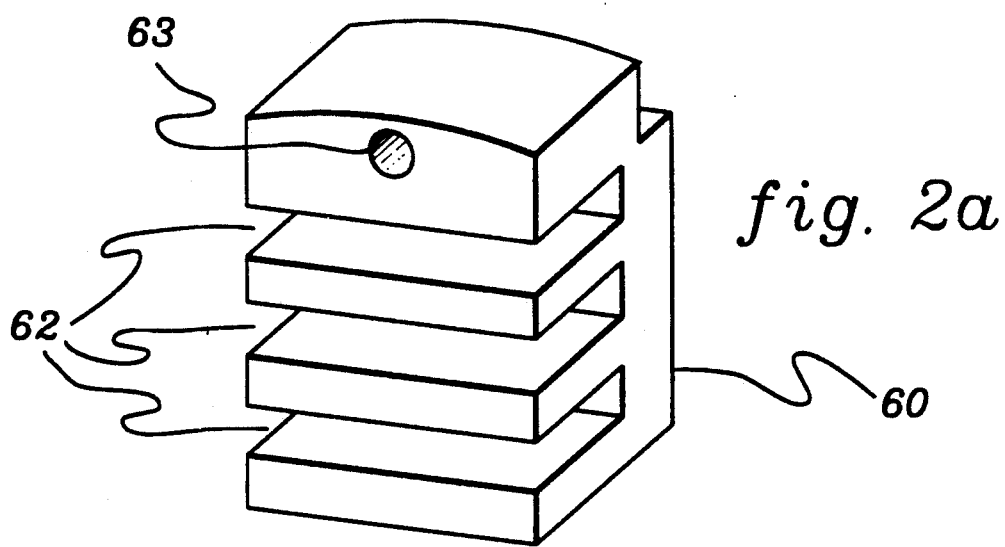
FIGS. 2A-2C depict isometric, side and top views, respectively, of a spacer used in the system depicted in FIG. 1.
Figure 2B:
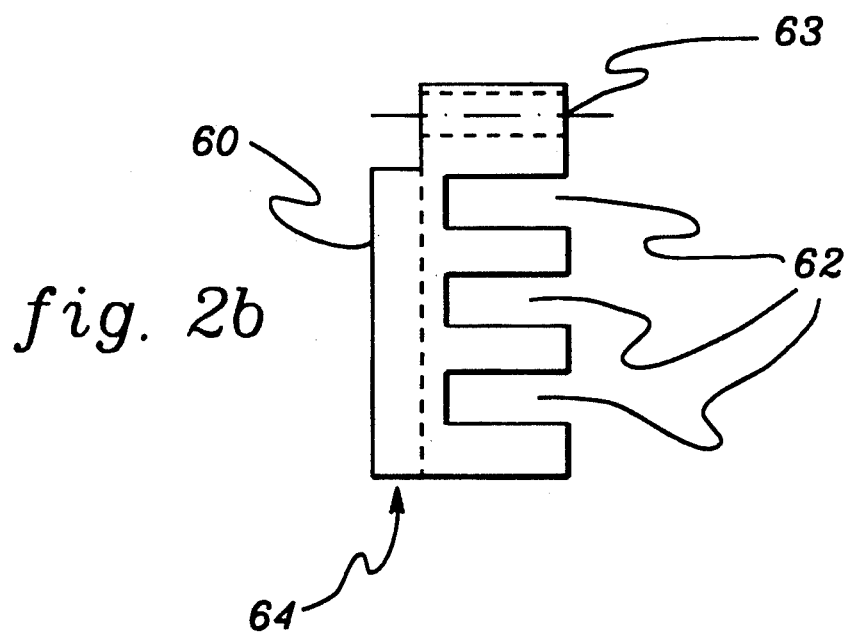
Figure 2C:
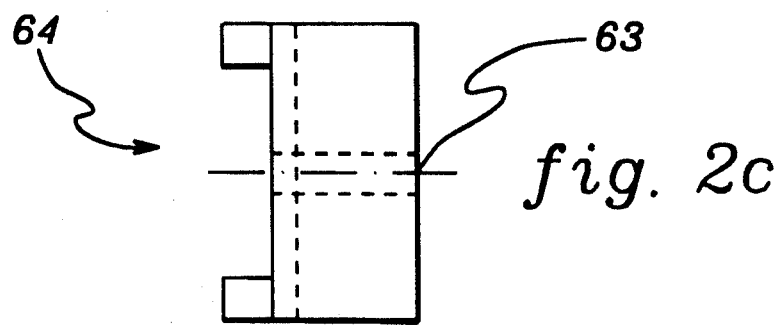
Figure 7:
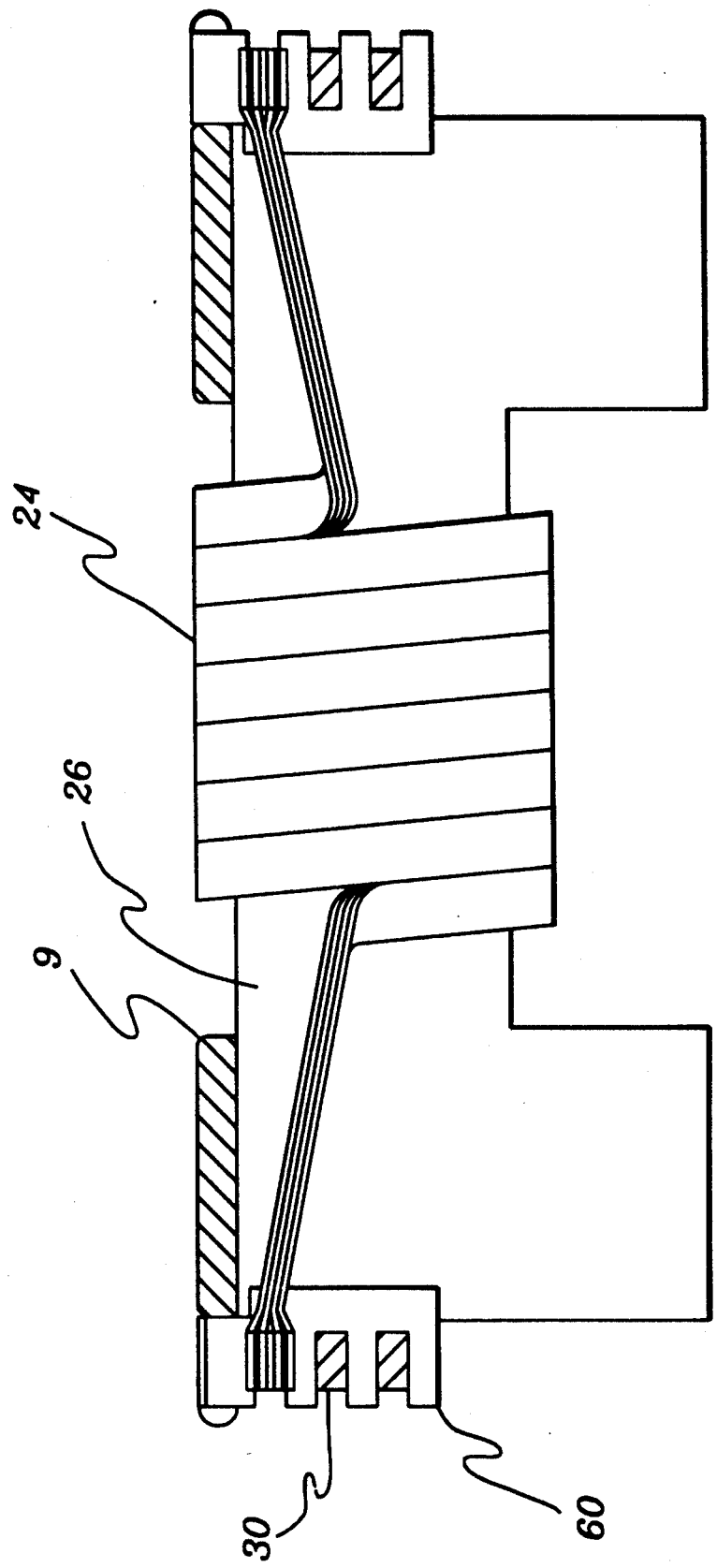
FIGS. 7 depicts a C-shaped armature element including armature winding and a spacer mounted thereon and a ring shaped member.

A spacer 60 may be mounted at each end of a C-shaped armature element. The spacer may be configured, as shown in FIGS. 2A-2C, to comprise a plurality of grooves 62 therein running perpendicular to a vertically positioned channel 64 located at the opposite side thereof. The spacer 60 may be generally used in high powered dynamoelectric machines where heavy gauge conductors are necessary to provide current to the armature windings and in high speed machines where multiple conductors are needed. Referring again to FIG. 2A-2C, the channel 64 is sized to receive the leg portion 34 of the C-shaped armature element such that the spacer 60 may be mounted thereon. The spacer 60 is preferably made of an insulator, such as ceramic, to prevent contact between interconnecting bars 30 (described infra) and the C-shaped armature element 26. The spacer may be of various configurations and the invention is not limited to any particular embodiment depicted herein. The spacer 60 functions as both an insulator and a support for heavy gauge interconnecting bars which act as conductors. FIG. 7 illustrates the mounting of a spacer 60, supporting interconnecting bars 30, on each end of an individual armature element 26.

Figure 4:
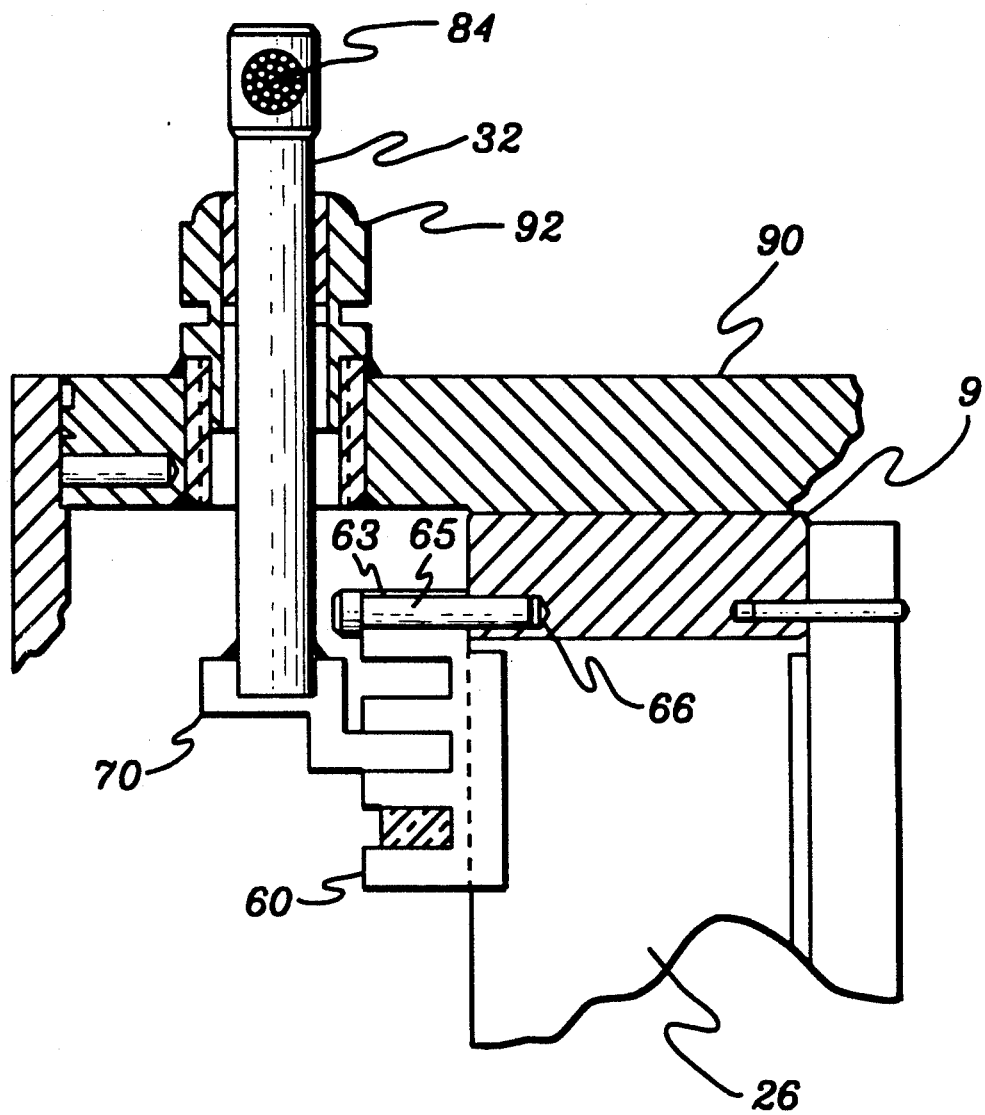
FIG. 4 depicts a sectional, broken away view of a portion of the stator support assembly of the dynamoelectric machine including a system for supplying current to assembly.

FIG. 4 depicts a cutaway portion of the system for supporting conductors in a dynamoelectric machine where the spacer 60 is mounted on the C-shaped armature element 26. The spacer 60 contains a fastener 65 inserted through the aperture 63 in the spacer and into the ring shaped member 9. However, any other holding means, such as a clamp, snap, grooves, retainer, etc. may be used to support the spacer. The fastener 65 may comprise a machine screw or bolt which may be threaded directly into a complimentary threaded bore 66 within the ring shaped member 9. Since the ring shaped member 9 is mounted between the wall of the housing 90 of the machine and the armature element 26, the fastener securely affixes the spacer. However, other techniques for securing the spacer 60 to the stator assembly may also be used. For example, the spacer 60 may be affixed to the C-shaped armature element 26 by an epoxy resin or the like. To supply current to the armature windings a conductor bar 32 (FIG. 4) is inserted through a bushing 92 located within the housing 90. The conductor bar is fed with a supply cable 84. Within the machine the conductor bar 32 is welded to a receiver 70.

The receiver 70 (shown in detail in FIG. 8) contains a leg 71 which is sized to be inserted within the grooves 62 of the spacer 60 thereby enabling the receiver to be supported by the stator assembly. The leg of the receiver contains a junction arm 74 which may be connected to the windings of an armature element 26 such that the power from the supply cable 84 is transmitted by the receiver to the armature winding. The receiver contains a well 73 sized to receive the conductor bar 32 therein. The junction arm 74 includes cut out portions 75 therein. The cut out portions 75 are sized such that the windings 24 of an armature element 26 may be inserted therein. The windings may be spot welded to the junction arm of the receiver 70 so as to be permanently affixed thereto.

FIG. 3A depicts a typical interconnecting bar 30 containing junctions 31 at each end; FIG. 3B depicts an armature winding 24 connected to an interconnecting bar 30. The armature windings 24 contain individual ribbon shaped conductors 25 which are sized to be inserted into the recesses of the junction 31 of the interconnecting bar 30, as shown in FIG. 3B. The interconnecting bar 30 may be connected to the windings 24 by a spot weld, brazing, or some other similar technique. As shown in FIG. 9, the interconnecting bar 30 may also comprise a plurality of ribbon-like conductors 27 in order to minimize the conductor's resistance at high frequencies. In this situation, the ends of the interconnecting bar 30 may be brazed to the armature winding 24.

Figure 5:
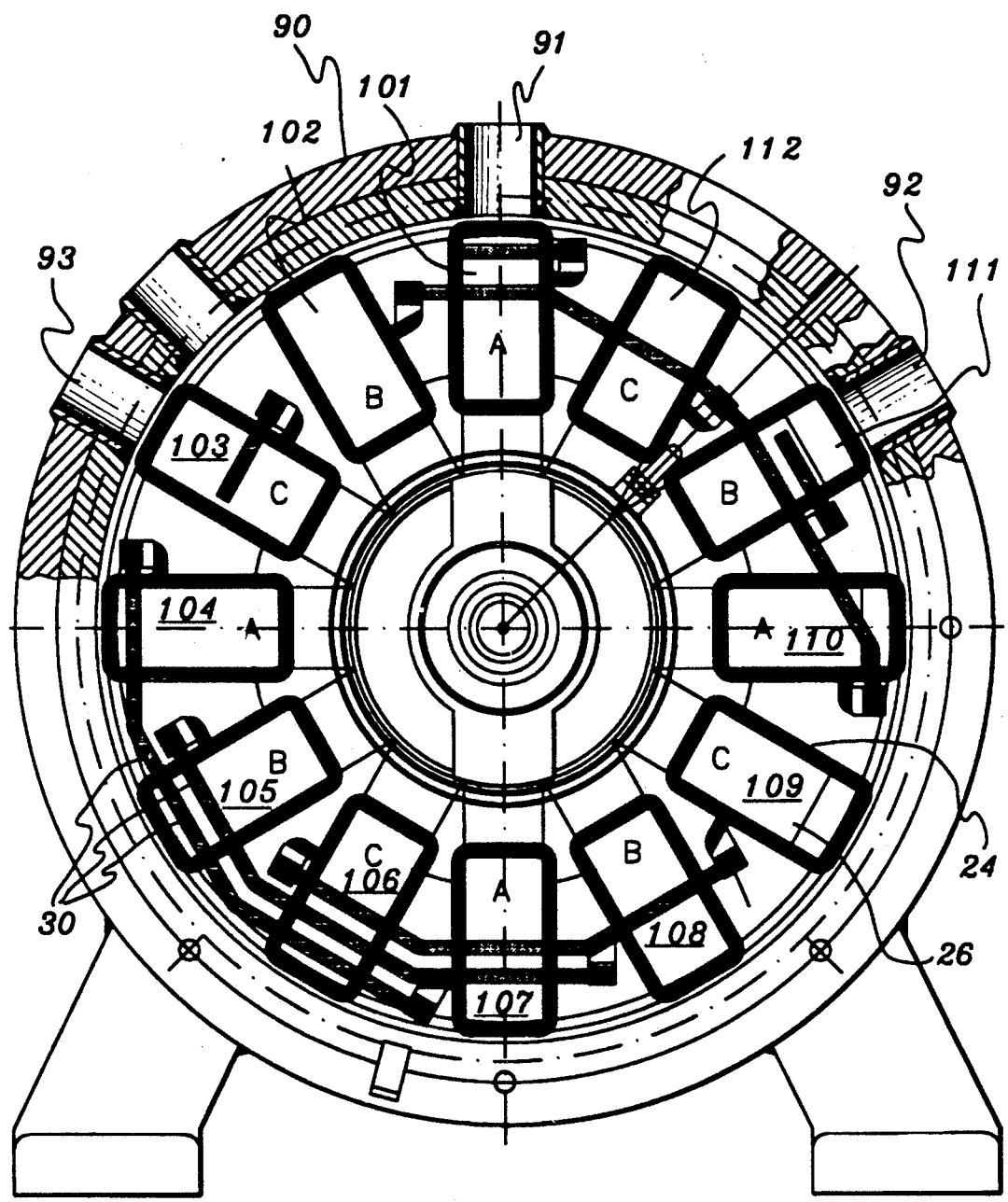
FIG. 5 is a simplified cross sectional view depicting interconnecting bars located towards the second end wall of the dynamoelectric machine depicted in FIG. 1.

FIG. 5 depicts in a simplified fashion, interconnecting bars located towards the second end well 53', as if viewed from the first end well, superimposed on the stator assembly of the dynamoelectric machine depicted in FIG. 1. Twelve C-shaped armature elements 26 are mounted about the circumference of the machine with their base portions extending generally parallel to central longitudinal axis 6. The armature elements support respective armature windings 24 which are wound in the same axial direction. This assures that all of the individual winding terminals at a respective is of the motor have the same polarity. Since the dynamoelectric machine is a three phase motor, three different phases of currents are input into the dynamoelectric machine and connected to separate armature windings 24. Reference to the armature elements will be made by denoting the first armature element 101. The second armature element will be the next armature element in a counter clockwise direction from the first armature element. Each of the armature elements will therefore be numbered and referred to as one of the first through twelfth armature elements. The armature elements are consecutively numbered counter clockwise from the first armature element 101 to the twelfth armature element 112 in FIG. 5.

The winding of the first 198 fourth 198' seventh 198" and tenth 198 ''' armature elements are connected to a first phase current supply line which is inputted from the opening 91 in the housing 90. The winding eleventh of the second (102) fifth (105) and eighth (108) armature elements are connected to a second phase current supply input through opening 92 in the housing 90. Armature windings located on the third (103), sixth (106), ninth (109) and twelfth (118) armature elements are connected to a third phase current supply line which is fed into opening 93 of the housing. As more fully described hereinafter, the windings of armature elements supplied with the same phase current are connected to each other by the interconnecting bars 30 which act as conductors therebetween. Preferably, however, the interconnecting bars do not come in contact, or cross, other interconnecting bars. Also, the three current phases combine at a neutral point. In order to accomplish these results, the interconnecting bars must be orientated in a particular manner.

Figure 6A:
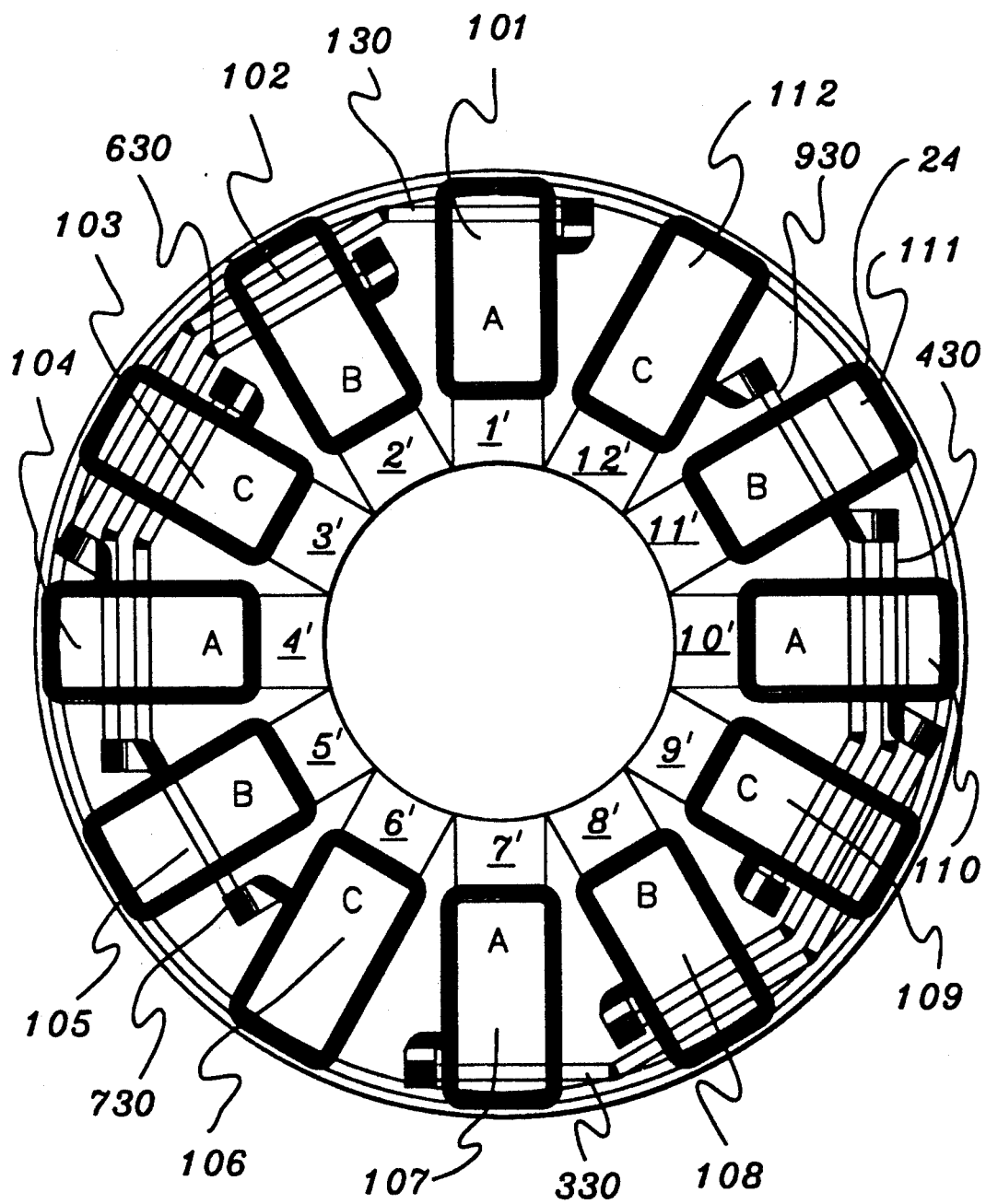
FIGS. 6A and 6B depict simplified axial views from a first end wall of interconnecting bars located towards the first end wall and second end wall, respectively of the stator assembly of the dynamoelectric machine shown in FIG. 1 without the field windings and end supports.
Figure 6B:
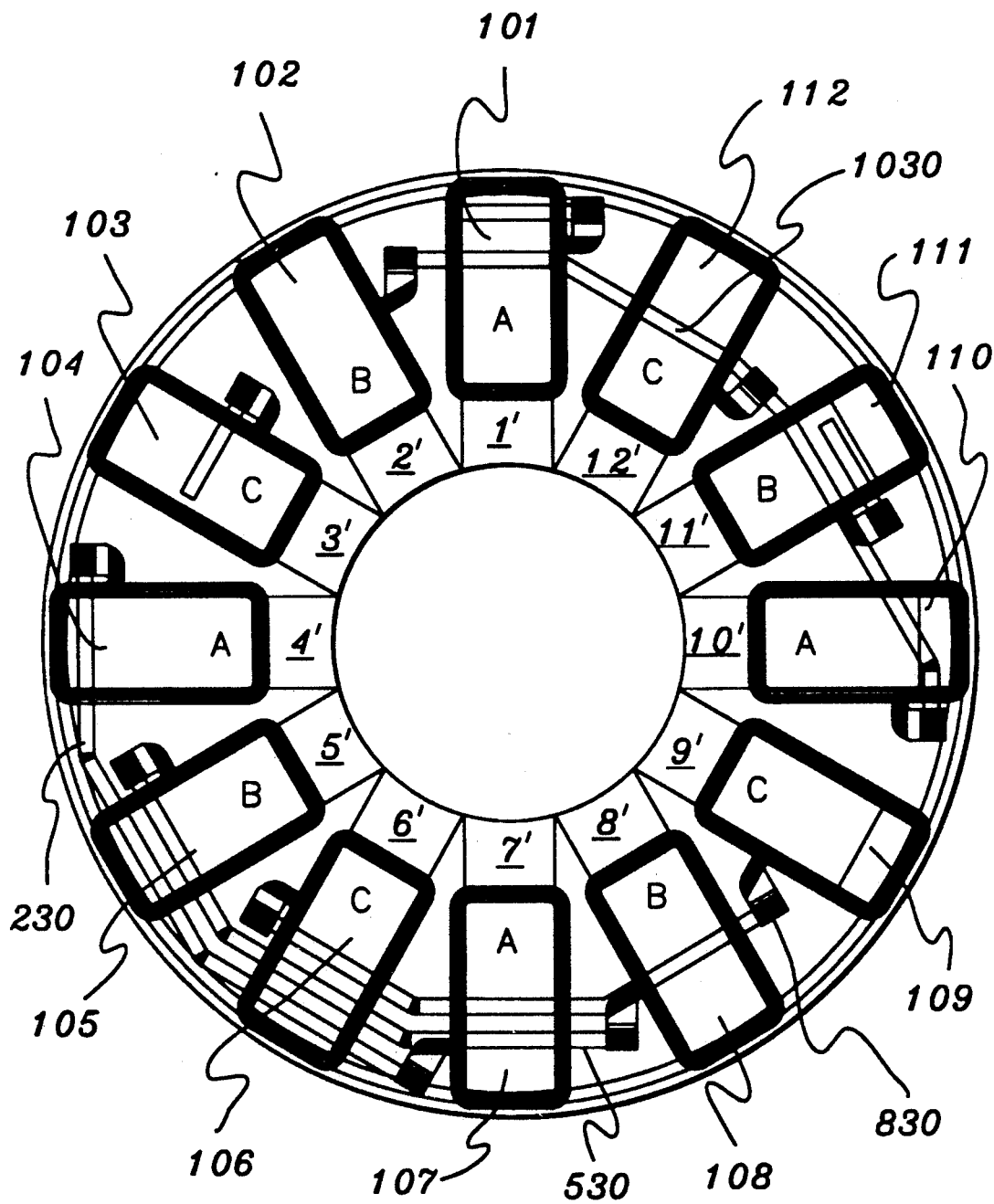

The orientation of the interconnecting bars will now be discussed with reference to FIGS. 6A and 6B. FIGS. 6A and 6B represent axial views of the stator assembly showing the interconnecting bars located towards the first end and second end, respectively of the dynamoelectric machine shown in FIG. 1, all as if viewed from the first end wall. The C-shaped armature elements are sequentially numbered 1'-12' and will be referred to in their sequential order beginning from a first armature element 101 and continuing counter clockwise to a twelfth armature element 112. The armature elements contain armature windings 24 which are connected to interconnecting bars 30 supported within the grooves of the spacers 60, as previously discussed herein, to form a circuit. For simplicity of the illustration, spacers 60 and the connections to outside supply lines are not shown in FIGS. 5, 6A and 6B. The first armature element's windings is supplied with a current at a first phase, commonly referred to as phase A. The current is supplied to the end of the winding of the first armature 1' which is located towards the second end wall 53' of the dynamoelectric machine (FIG. 6B). The opposite end of the winding of the first armature element 1' is connected to an interconnecting bar 130 (FIG. 6A) which is supported within the grooves of each of the spacers located on the first, second and third armature elements. The first interconnecting bar 130 is also connected to the end of the winding of the fourth armature element 4' located towards the first end wall of the machine (FIG. 6A). The opposite end of the winding of the fourth armature element 4', located towards the second end wall of the machine (FIG. 6B), is connected to a second interconnecting bar 230 which is supported by spacers affixed to the fourth, fifth and sixth armature elements. The second interconnecting bar 230 is also connected to the end of the winding of the seventh armature element 7' located towards the second end wall of the machine (FIG. 6B). The opposite end of the winding of the seventh armature element 7', located towards the first end wall of the machine (FIG. 6A), is connected to a third interconnecting bar 330 which is supported by the spacers located on the seventh, eighth and ninth armature elements. The third interconnecting bar 330 is also connected to the end of the winding of the tenth armature element 10' located towards the first end wall of the machine (FIG. 6A). Therefore the first, fourth, seventh and tenth armature element windings are supplied with a current at a first phase.

A current at a second phase (phase B) is supplied into the machine and is connected to the end of the winding of the eleventh armature element located towards the second end wall of the machine (FIG. 6B). The opposite end of the winding of the eleventh armature element 11' is connected to a fourth interconnecting bar 430 at the first end of the machine (FIG. 6A). The fourth interconnecting bar 430 is supported by spacers located on the tenth, ninth and eighth armature elements. The fourth interconnecting bar is also connected to the end of the winding of the eighth armature element 8' located towards the first end of the machine (FIG. 6A). The opposite end of the winding of the eighth armature element 8', located towards the second end of the machine, is connected to a fifth interconnecting bar 530 which is supported by spacers located on the seventh, sixth and fifth armature elements towards the second end of the machine (FIG. 6B). The fifth interconnecting bar 530 is also connected to the end of the winding of the fifth armature element 5' located towards the second end wall of the machine (FIG. 6B). The opposite end of the winding of the fifth armature element 5', located towards the first end wall of the machine, is connected to a sixth interconnecting bar 630 (FIG. 6A). The sixth interconnecting bar 630 is supported by spacers located on the fourth, third and second armature elements. The sixth interconnecting bar 630 is also connected to the end of the winding of the second armature element 2' located towards the first end wall of the machine (FIG. 6A). Therefore a current supplied at a second phase (phase B) is fed through the windings of the eleventh, eighth, fifth and second armature elements.

A current at a third phase (phase C) is supplied to the end of the winding of the third armature element 3' located towards the second end wall of the machine (FIG. 6B). The opposite end of the winding of the third armature element 3' located towards the first end of the machine is connected to a seventh interconnecting bar 730 located towards the first end wall of the machine (FIG. 6A). The seventh interconnecting bar 730 is supported by spacers on the third, fourth and fifth armature elements. The seventh interconnecting bar 730 is also connected to the end of the winding of the sixth armature element 6' located towards the first end wall of the machine (FIG. 6A). The opposite end of the winding of the sixth armature element 6', is connected to an eighth interconnecting bar 830 located towards the second end wall of the machine (FIG. 6B). The eighth interconnecting bar 830 is supported by spacers located on the sixth, seventh and eighth armature elements. The eighth interconnecting bar 830 is also connected to the end of the winding of the ninth armature element 9' located towards the second end wall of the machine (FIG. 6B). The opposite end of the winding of the ninth armature element 9', located towards the first end of the machine, is connected to ninth interconnecting bar 930 (FIG. 6A). The ninth interconnecting bar 930 is supported by spacers located on the ninth, tenth and eleventh armature elements (FIG. 6A). The ninth interconnecting bar is also connected to the end of the winding of the twelfth armature element 12' located towards the first end wall of the machine (FIG. 6A). Therefore current at a third phase (phase C) is supplied to the winding of the third armature element and fed to the sixth, ninth and twelfth armature elements.

The ends of the windings of the tenth, twelfth and second armature elements located towards the second end of the machine (FIG. 6B) are each connected to a tenth interconnecting bar 1030 which is supported by spacers on the first, twelfth, eleventh and tenth armature elements. Therefore the tenth interconnecting bar 1030 provides a neutral point where all phases of current are combined. The interconnecting bars having a current at a first phase flowing therethrough are supported on the outermost radially positioned grooves of the spacers. The armature windings which are fed with a current at a second phase are connected with interconnecting bars which are positioned on the second outermost radially positioned grooves of the spacers. Also, the interconnecting bars which connect the armature windings which are fed with the third phase of current are supported on the innermost radially positioned grooves of the spacers.

The interconnecting bars are positioned such that there is no cross over, or contact between, interconnecting bars conducting different phases of currents. Also, the neutral phase point is located near proximate armature elements, and all phases are input at the second end of the machine. Moreover, there is a fairly even voltage distribution between interconnecting bars such that large voltage gradients are avoided. The amount of space needed for interconnecting bars is minimized. Moreover, each interconnecting bar conducting different phases of current is located at a different radial position, within the grooves of the spacers, relative to the center line of the machine.

Although the description of the positioning of the interconnecting bars and conductor support system of the stator assembly of the machine has been described in relation to a first through twelfth armature element, as depicted in the drawings, the position of the first and twelfth armature elements may be assigned to any two adjacent armature elements. Moreover, the principles of the present invention are not limited to any particular stator configuration or any machine having a specific number of C-shaped armature elements. For example, the invention may be implemented in a machine having 12, 18, 24, 30, etc. armature elements. Also, the invention may be implemented in various dynamoelectric machines having a variety of poles therein, such as four, six, eight, etc. pole machine.

Although the invention has been disclosed in relation to the specific embodiments described and depicted herein, it will be apparent to those skilled in the art that various modifications, substitutions and the like may be made without departing from the scope of the invention, as defined by the following claims.

What is claimed is:

1. A system for supporting conductors which interconnect windings of armature elements, one to another, in a dynamoelectric machine having a stator assembly including a plurality of stationary armature elements spaced along a circumference, the armature elements being positioned radially about a central longitudinal axis, each armature element including an armature winding on a longitudinally extending base portion thereof and a leg extending from each end of said base portion in a radially inward direction, said system comprising:

a spacer for supporting one or more electrical conductors and for insulating said one or more electrical conductors from one of said armature elements, said spacer being mountable on said armature element; and an electrical conductor adapted to be supported by said spacer, said electrical conductor extending between a pair of said armature elements and electrically interconnecting said armature windings of said pair, one to another.

2. The system of claim 1 wherein the electrical conductors comprise interconnecting bars and the spacer comprises one or more grooves therein for supporting one or more interconnecting bars, said interconnecting bars being capable of connecting the armature windings of two or more armature elements.

3. The system of claim 2 further comprising means for fastening the spacer to the stator assembly.

4. The system of claim 3 wherein the means for fastening the spacer to the stator assembly comprises an aperture located within the spacer, the aperture being capable of receiving a fastener therethrough.

5. The system of claim 4 further comprising a fastener inserted through the aperture into the stator assembly.

6. The system of claim 5 wherein the fastener is inserted into a ring shaped member of the stator assembly.

7. The system of claim 3 wherein the spacer further comprises a recess sized to receive one of said armature elements therein for positioning the spacer on said armature element, the recess being located in a position on the spacer such that the grooves are exposed to an end wall of the machine when the spacer is positioned on the armature element.

8. The system of claims 2 or 7 wherein said system comprises: a plurality of spacers each of the plurality of spacers being mounted on a corresponding discrete armature element; and a plurality of said interconnecting bars supported by said spacers and interconnecting armature windows of sets of armature elements for different phases of current.

9. The system of claim 2 wherein the interconnecting bars comprise a plurality of individual ribbon-like strands.

10. A system for supplying current to a stator assembly of a dynamoelectric machine having a plurality of stationary armature elements spaced along a circumference, the armature elements being positioned radially about a central longitudinal axis, each armature element including an armature winding on a longitudinally extending base portion thereof and a leg extending from each end of said base portion in a radially inward direction, each leg located towards one of two end walls of the dynamoelectric machine, said system comprising:

- a plurality of spacers, each spacer mounted on an armature element and having a plurality of grooves therein, each spacer being configured to enable the grooves therein to be oriented towards an adjacent end wall of the dynamoelectric machine;
- a plurality of interconnecting bars acting as conductors for interconnecting the armature windings of selected armature elements one to another, each interconnecting bar inserted within a groove of one or more spacers thereby being supported by said one or more spacers; and
- means for connecting the interconnecting bars to the armature windings of the selected armature elements.

11. The system according to claim 10 wherein the stator assembly comprises twelve circumferentially oriented Cshaped armature elements, each armature element numbered sequentially starting from a first armature element and continuing counterclockwise to a twelfth armature element, each of said armature elements having an armature winding wound thereon in an identical axial direction, the interconnecting bars being connected at each end thereof to an armature winding of two different armature elements.

12. The system according to claim 11, wherein the grooves of each of the spacers form a first, second, and third radial mounting position for said interconnecting bars.

13. The system according to claim 12 wherein:
the windings of a first and a fourth of said armature elements are connected to each other by a first of said interconnecting bars located towards a first end wall of the machine;
the armature windings of the fourth and a seventh of said armature elements are connected to each other by a second of said interconnecting bars located towards a second end wall of the machine;
the armature windings of the seventh and a tenth of said armature elements are connected to each other by a third of said interconnecting bars located towards the first end wall of the machine; and
an end of the winding of the first armature element located towards the second end wall of the machine is connected to an external current at a first phase.

14. The system of claim 13 wherein:
the armature windings of an eleventh and an eighth of said armature elements are connected to each other by a fourth of said interconnecting bars located towards the first end wall of the machine;
the armature windings of the eighth and a fifth of said armature elements are connected to each other by a fifth of said interconnecting bars located towards the second end wall of the machine;
the armature windings of the fifth and a second of said armature elements are connected to each other by a sixth of said interconnecting bars located toward the first end wall of the machine; and
an end of the winding of the eleventh of said armature elements located towards the second end wall of the machine is connected to an external current at a second phase.

15. The system of claim 14 wherein:
the armature windings of a third and a sixth of said armature elements are connected to each other by a seventh of said interconnecting bars towards the first end wall of the machine;
the armature windings of the sixth and a ninth of said armature elements are connected to each other by an eighth of said interconnecting bars located towards the second end wall of the machine;
the armature windings of the ninth and a twelfth of said armature elements are connected to each other by a ninth of said interconnecting bars located towards the first end wall of the machine;
an end of the armature winding of the third of said armature elements located towards the second end wall of the machine is connected to an external current at a third phase; and
the armature windings of the tenth, twelfth and second of said armature elements are connected to each other by a tenth interconnecting bar located towards the second end wall of the machine thereby forming a neutral phase point.

16. The system of claim 10 or 15 wherein the means for connecting the interconnecting bars to the armature windings comprises a plurality of slots located at ends of each of the interconnecting bars, said ends being capable of meshing with armature windings therein, wherein the armature windings and the ends of the interconnecting bars can be brazed together.

17. The system of claim 16 further comprising a conductive receiver for connecting a conductor bar to one of said armature windings thereby allowing a current to be transmitted to the armature winding via the conductor bar and receiver.

18. The system of claim 17 wherein the receiver comprises a leg capable of being inserted into one of the grooves of the spacer whereby the receiver may be supported by the spacer.

19. The system of claim 18, wherein the receiver leg contains a plurality of slots therein for receiving an end of an armature winding.

20. The system of claim 10 wherein said interconnecting bars conducting different phases of current are located at different radial positions, within the grooves of the spacers, relative to the central longitudinal axis.

21. The system of claim 9 or 20 wherein the interconnecting bars conducting different phases of current do not contact one another.

22. The system of claim 21 further comprising an interconnecting bar which provides a neutral point where all phases of current are combined.

* * * * *

UNITED STATES PATENT AND TRADEMARK OFFICE
CERTIFICATE OF CORRECTION

PATENT NO. : 5,196,752
DATED : March 23, 1993
INVENTOR(S) : Rodolfo Palma

It is certified that error appears in the above-indentified patent and that said Letters Patent is hereby corrected as shown below:

Column 10, line 38, substitute --interconnecting-- for "connecting".

Column 12, line 43, insert --said one of-- between "to" and "the"; replace "winding" with --windings--.

Signed and Sealed this

Second Day of August, 1994

Attest:

BRUCE LEHMAN

Attesting Officer     Commissioner of Patents and Trademarks